United States Patent Office 2,824,863
Patented Feb. 25, 1958

2,824,863

ACYLMERCAPTO COMPOUNDS

Robert Schwyzer, Riehen, Switzerland, assignor to Ciba Pharmaceutical Products, Inc., Summit, N. J.

No Drawing. Application November 12, 1953
Serial No. 391,738

Claims priority, application Switzerland November 14, 1952

14 Claims. (Cl. 260—112)

This invention relates to S-aminoacylmercapto compounds of the formula

A—X—CO—S—Y—Z and salts thereof. In this formula, A represents an amino group which may be free or substituted, e. g. by acyl, acylaminoacyl, aminoacylaminoacyl, alkyl, alkylene, cycloalkyl, aryl, aralkyl, and/or heterocyclic radicals, for instance the acetyl-, aminoacetyl-, aminoacetylaminoacetyl-, carbobenzoxyaminoacetyl-, carbobenzoxyaminoacetylaminoacetyl-, benzoyl, phthaloyl-, nitrophenoxyacetyl-, carboxybenzoxy-, thiocarbobenzoxy-, dimethyl- or diethylamino or piperidino or morpholino group. X and Y stand for any organic members whch may form isocyclic or heterocyclic rings, in particular members wherein A is separated from CO, or S from Z, by 1 to 4 carbon atoms, such as the methylene, ethylene, propylene or phenylene group. A—X—CO preferably represents the radical of a natural amino acid, such as an aminoacetyl or aminopropionyl radical. Z stands for an electrophilic substituent, especially for the carboxyl group, and also for the sulpho, the nitro or an acylamino group or a free, etherified or esterified hydroxyl group or for a halogen atom.

These aminoacyl mercapto compounds and also their salts with acids or, insofar as they contain acid groups, also with bases, are exceedingly reactive substances. They are therefore excellently suitable for the introduction of an aminoacyl radical by reacting them with compounds containing active hydrogen, for example, amines or alcohols, as is described in application Ser. No. 391,739, filed November 12, 1953, now Patent No. 2,788,341, granted April 9, 1957. This qualifies them for a wide variety of applications, especially for the synthesis of peptide compounds.

The new acylmercapto compounds can be prepared by reacting together compounds of the formulae A—X—B$_1$ and B$_2$—Y—Z in which B$_1$ and B$_2$ represent substituents which react to form the grouping —CO—S— linking X to Y; and A, X, Y and Z having the aforementioned significance. It is thus possible to react an amino carboxylic acid or a functional derivative thereof, such as its simple or mixed anhydrides, or halides, for example chloride, bromide or iodide, or an azide thereof, with correspondingly substituted mercapto compounds or salts thereof with an inorganic or organic base, preferably with a mercapto acetic acid or mercapto propionic acid and salts thereof. The reaction can be carried out in the presence or absence of solvents, with or without basic auxiliaries, such as pyridine, sodium carbonate and the like.

In products of this reaction which contain an acylamino group, this substituent can be converted into a free amino group by treatment with an acid medium without the carbothiolic acid ester being split up.

Depending on the working method the new compounds are obtained in a salt-free state or in the form of their salts. In the former state they can be converted into salts in the usual manner, as for example by reaction with an inorganic or organic acid, such as a hydrohalic acid, sulphuric acid, nitric acid, phosphoric acid, thiocyanic acid, acetic acid, propionic acid, oxalic acid, malonic acid, succinic acid, malic acid, methane sulphonic acid, ethane sulphonic acid, hydroxyethane sulphonic acid, benzene sulphonic acid or toluene sulphonic acid. Those of the new compounds which contain acid groups can be converted into salts of bases, such for example as alkali metal salts or alkaline earth metal salts.

The following examples illustrate the invention, the parts being by weight unless otherwise stated and the relationship of parts by weight to parts by volume being the same as that of the kilogram to the liter:

Example 1

The mixed anhydride prepared, at a low temperature, from 1.8 parts of benzoylamino-acetic acid and carbonic acid ethyl ester is allowed to stand at room temperature for half an hour with a mixture of 0.9 part of mercapto acetic acid, 1.0 part of triethylamine and 20 parts by volume of ethyl acetate. The solution is extracted by shaking with water and 1 N-hydrochloric acid, and the ethyl acetate layer is dried and evaporated. It leaves behind a crystalline residue which is then recrystallised from ether and water. There is thus obtained the S-(benzoylamino-acetyl)-mercapto acetic acid of the formula

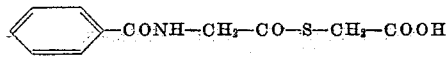

in the form of colorless, rod-shaped crystals which melt at 142–5° C. The yield is 80 percent.

By using instead of the mixed anhydride prepared from benzoylamino-acetic acid and carbonic acid ethyl ester, the mixed anhydride prepared from carbonic acid ethyl ester and phthalylaminoacetic acid or carbobenzoxyamino-acetic acid there are obtained in analogous manner:

S-(phthalimidyl-2-acetyl)-mercapto acetic acid of the formula

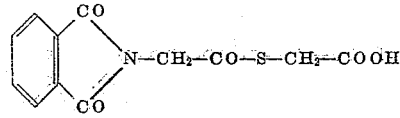

melting at 145° C. and S-(carbobenzoxyamino-acetyl)-mercapto acetic acid of the formula

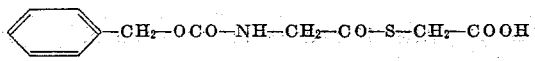

melting at 89° C.

By reacting the said mixed anhydride in the above example with β-mercapto propionic acid instead of mercapto acetic acid there is obtained:

S-(benzoylamino-acetyl)-β-mercaptopropionic acid of the formula

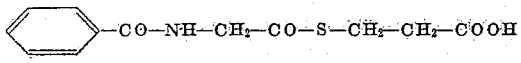

melting at 114° C.

Example 2

4.4 parts of freshly prepared hydrochloride of aminoacetyl chloride are mixed with 4 parts by volume of dry, distilled mercapto acetic acid. With the spontaneous evolution of heat hydrochloric acid begins to split off. To complete the reaction, the mass is maintained at 70° C. for half an hour and then at 90° C. for 20 minutes. The resulting clear mixture is triturated with 5 parts by volume of absolute ethanol and mixed with 5 parts by volume of acetone. In this way, about 80 percent of the calculated quantity of the hydrochloride of S-aminoacetylmercapto-acetic acid of the formula $$HCl \cdot H_2N-CH_2-CO-S-CH_2-COOH$$

is obtained. Further quantities can be isolated from the mother liquor. After recrystallization from a mixture of alcohol and acetone containing a small quantity of 2 N-hydrochloric acid, the white crystal mass melts at 124° C. and gives the correct empirical formula on analysis.

*Example 3*

1.8 parts of benzoylamino-acetic acid, 1.01 parts of triethylamine, and 1.08 parts of chloroformic acid ethyl ester are dissolved in a mixture of ethyl acetate and dimethyl formamide (5:1) and reacted at —5° C. to form the mixed anhydride. The reaction mass is then poured into a solution of 1.5 parts of thiosalicylic acid and 1.01 parts of triethylamine in ethyl acetate. After having been allowed to stand at room temperature for half an hour, the mass is washed with hydrochloric acid and water, dried with sodium sulfate and evaporated in vacuo. The residue can be recrystallized from alcohol, acetone, ethyl acetate, or benzene. Its melting point is at 151.5–153° C. Analysis gives the values of S-(benzoylaminoacetyl)-thiosalicylic acid. The reaction can be illustrated by this diagram:

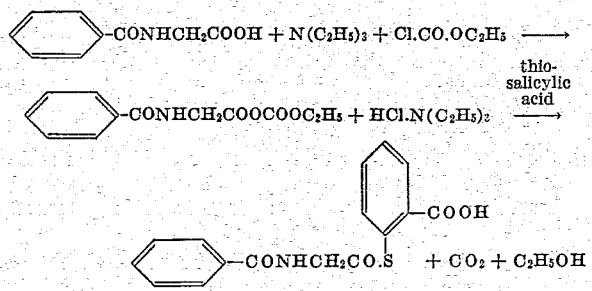

From N-carbobenzoxyamino-acetic acid there can be prepared in the same manner S-(carbobenzoxyaminoacetyl)-thiosalicylic acid of melting point 120.5–121.5° C. (from benzene or ether).

*Example 4*

0.64 part of N-[N-(carbobenzoxyamino-acetyl)-aminoacetyl]-aminoacetic acid (carbobenzoxy-diglycylglycine) is dissolved in 4 parts by volume of dimethylformamide, mixed with 0.21 part of triethylamine and some ethyl acetate and then treated with 0.22 part of chlorocarbonic acid ester at —10 to —5° C. Plenty of triethylammonium chloride separates (about 95 percent of the calculated quantity). After 10 minutes, the mixture is filtered into an ethyl acetate solution of 0.2 part of mercaptoacetic acid and 0.4 part of triethylamine. After half an hour's standing at room temperature the solution is admixed with 20 parts of by volume of 2 N-hydrochloric acid and the ethyl acetate separated. In the aqueous phase, crystallization of 0.52 part of colorless crystals sets in soon. After recrystallization from water the substance melts sharply at 175–176° C. and with sodium nitroprussiate and ammonia shows a retarded reaction to thioglycollic acid. According to analytical results and in the light of all its properties the substance is S-[N-(N-carbobenzoxyaminoactyl - aminoacetyl) - aminoacetyl] - mercaptoacetic acid (S - carbobenzoxytriglycyl) - mercaptoacetic acid).

*Example 5*

0.1 part of S-carbobenzoxyaminoacetyl-mercaptoacetic acid is dissolved in 1 part by volume of glacial acetic acid and after the introduction of a boiling stone mixed with 1 part by volume of glacial acetic acid saturated with hydrogen bromide. After about 1 hour the evolution of carbon dioxide is complete (at room temperature). The solvent is removed under reduced pressure, the residue washed with ethyl acetate and dissolved in a little absolute alcohol. After the addition of large quantity of acetone the product crystallizes in the form of colorless needles (yield, approx. 90%). The substance is separated by filtration with suction and washed with acetone and ether. It dissolves readily in water and gives with sodium nitroprussiate and ammonia a retarded reaction to thioglycollic acid. Its melting point is at 145–146.5° C. Analysis gives the values for the hydrobromide of S-amino-acetyl-mercaptoacetic acid.

*Example 6*

0.59 part of S-[N-(N-carbobenzoxyaminoacetylaminoacetyl)-aminoacetyl]-mercaptoacetic acid (S-(carbobenzoxytriglycyl)-mercaptoacetic acid) is dissolved in 6 parts of volume of hot glacial acetic acid and cooled to room temperature, whereupon the compound for the greater part separates out again. 2 parts of glacial acetic acid, saturated with hydrogen bromide are then added. A clear solution results immediately. Upon the introduction of a boiling stone the evolution of $CO_2$ sets in and is complete at the end of 20 minutes at 40° C. The solvent is removed in vacuo and the residue washed with ethyl acetate, acetone and ether. On trituration with 8 parts by volume of absolute alcohol it crystallizes. There is obtained 0.43 part of a nearly pure substance (yield, approx. 81%). After recrystallization from alcohol, the melting point is at 180.5–181° C. Analysis gives the values for the hydrobromide of S-[N-(N-aminoacetyl-aminoacetyl)-aminoacetyl]-mercaptoacetic acid (hydrobromide of S-triglycyl-mercaptoacetic acid). The compound readily dissolves in water.

What is claimed is:

1. A member selected from the group consisting of amino-thiolcarboxylic acid esters of the formula $$A-X-CO-S-Y-Z$$

wherein A represents a member of the group consisting of a free amino group, an amino group acylated by the acyl radical of a carboxylic acid of the group consisting of natural aminocarboxylic acids and peptide carboxylic acids, and an amino group protected by an aromatic carboxylic acid residue selected from the group consisting of benzoyl, phthalyl and carbobenzoxy, X stands for the divalent radical linking the amino and carboxyl group of a natural lower aliphatic amino acid, Y stands for a member of the group consisting of lower alkylene and phenylene radicals and Z represents a carboxyl group, and salts thereof.

2. Aminothiolcarboxylic acid esters of the formula $$A-X-CO-S-Y-Z$$

wherein A represents an amino group acylated by the acyl radical of a natural aminocarboxylic acid, X stands for the divalent radical separating the amino and carboxyl group of a natural, lower aliphatic amino acid by 1 to 4 carbon atoms, Y stands for a lower alkylene radical which separates S from Z by 1 to 4 carbon atoms, and Z represents a carboxyl group.

3. Aminothiolcarboxylic acid esters of the formula

A—X—CO—S—Y—Z wherein A represents an amino group acylated by the acyl radical of a peptide carboxylic acid, X stands for the divalent radical separating the amino and carboxyl group of a natural, lower aliphatic amino acid by 1 to 4 carbon atoms, Y stands for a lower alkylene radical which separates S from Z by 1 to 4 carbon atoms, and Z represents a carboxyl group.

4. Aminothiolcarboxylic acid esters of the formula

A—X—CO—S—Y—Z wherein A—X—CO is the radical of a natural, lower aliphatic amino acid, Y stands for a lower alkylene radical and Z represents a carboxyl group.

5. Aminothiolcarboxylic acid esters of the formula

A—X—CO—S—Y—Z wherein A—X—CO is the radical of a natural, lower aliphatic amino acid, Y stands for a phenylene radical and Z represents a carboxyl group.

6. S-(phthalylamino-acetyl)-mercaptoacetic acid.

7. S-(benzoylamino-acetyl)-$\beta$-mercaptopropionic acid.
8. S-(carbobenzoxyamino-acetyl)-thiosalicylic acid.
9. S - [N - (N-carbobenzoxyaminoacetyl-aminoacetyl)-aminoacetyl]-mercaptoacetic acid.
10. S - [N-(N-aminoacetyl-aminoacetyl)-aminoacetyl]-mercaptoacetic acid.
11. S - (carbobenzoxy amino acetyl) - mercaptoacetic acid.
12. S-(aminoacetyl)-mercaptoacetic acid.
13. S-(benzoylamino-acetyl)-mercaptoacetic acid.
14. S-(benzoylamino-acetyl)-thiosalicylic acid.

References Cited in the file of this patent
UNITED STATES PATENTS

| | | |
|---|---|---|
| 2,090,756 | Hansen | Aug. 24, 1937 |
| 2,342,142 | Harris et al. | Feb. 22, 1944 |
| 2,547,542 | Rowland | Apr. 3, 1951 |
| 2,608,574 | Clinton | Aug. 26, 1952 |
| 2,642,433 | Duschinsky | June 16, 1953 |
| 2,669,564 | Clinton et al. | Feb. 16, 1954 |
| 2,673,839 | Kirshenbaum et al. | Mar. 30, 1954 |
| 2,744,118 | Cavalla | May 1, 1956 |
| 2,744,119 | Walton | May 1, 1956 |

OTHER REFERENCES

J. Am. Chem. Soc., vol. 55, pp. 2872–4 (1933).